Feb. 17, 1959  C. J. SMITH  2,873,841
ORIENTATING APPARATUS
Filed April 5, 1956  10 Sheets-Sheet 1

INVENTOR.
Clarence J. Smith
BY:
Olson & Trexler
Attys.

Feb. 17, 1959 C. J. SMITH 2,873,841
ORIENTATING APPARATUS
Filed April 5, 1956 10 Sheets-Sheet 2

INVENTOR.
Clarence J. Smith
By: Olson & Trexler
Attys.

United States Patent Office 2,873,841
Patented Feb. 17, 1959

2,873,841

ORIENTATING APPARATUS

Clarence J. Smith, Rockford, Ill., assignor to W. F. and John Barnes Company, Rockford, Ill., a corporation of Illinois Application April 5, 1956, Serial No. 576,313

11 Claims. (Cl. 198—31)

The present invention relates to a novel apparatus for handling articles, and more particularly to a novel apparatus for unscrambling or orientating articles received from a source of supply.

It has been proposed to store a supply of articles such as cans or the like in large storage bins, trucks, or railroad cars so that an adequate supply of the articles or cans is available for delivery to processing or can filling and closing apparatus. The cans or the like are piled in the storage bin in a manner so that it is necessary to unscramble or orientate the cans upon delivery from the storage bin in order that they may be properly positioned for presentation to processing or can filling apparatus. It is therefore an important object of the present invention to provide a novel apparatus for receiving cans or the like from a source of supply wherein the cans are indiscriminately arranged and for unscrambling or orientating the cans so that the cans are arranged in a predetermined manner.

A further object of the present invention is to provide a novel apparatus for orientating cans or the like received from a source of supply and having only one end or bottom member attached thereto so that the cans are discharged in one or more lines with their closed or bottom ends in predetermined arrangement.

Another object of the present invention is to provide a novel apparatus of the above described type whereby the cans or articles may be orientated rapidly, surely and without substantial injury thereto.

A more specific object of the present invention is to provide a novel apparatus whereby indiscriminately positioned cans or articles in a plurality of lines from a source of supply may be orientated as to the relative position of their ends and also arranged in a reduced number of lines for delivery to filling or processing apparatus or any suitable point of discharge.

Still another object of the present invention is to provide a novel apparatus of the above described type which is of relatively simple and rugged construction and which may be readily manufactured and maintained.

Other objects and advantages of the present invention will become apparent from the following description and the accompanying drawings wherein:

Fig. 8 is an enlarged partial sectional view taken along line 8—8 in Fig. 7a;

Fig. 9 is an enlarged fragmentary sectional view taken along line 9—9 in Fig. 7a;

Figure 1:
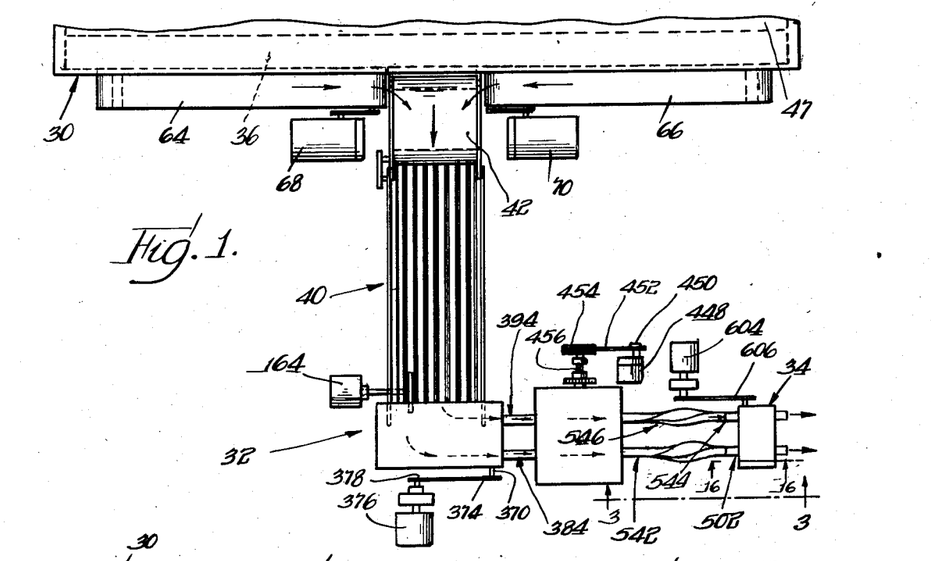
Fig. 1 is a simplified plan view showing an apparatus embodying the features of the present invention.
Figure 2:
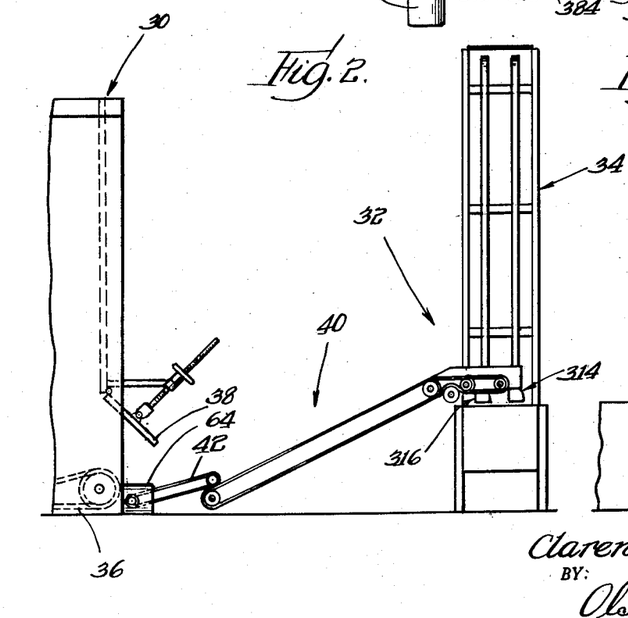
Fig. 2 is a simplified side elevational view showing the apparatus of this invention.
Figure 3:
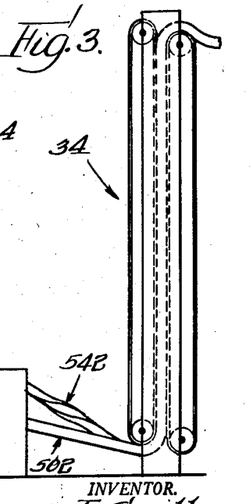
Fig. 3 is a fragmentary simplified elevational view taken along line 3—3 in Fig. 1.
Figure 4:
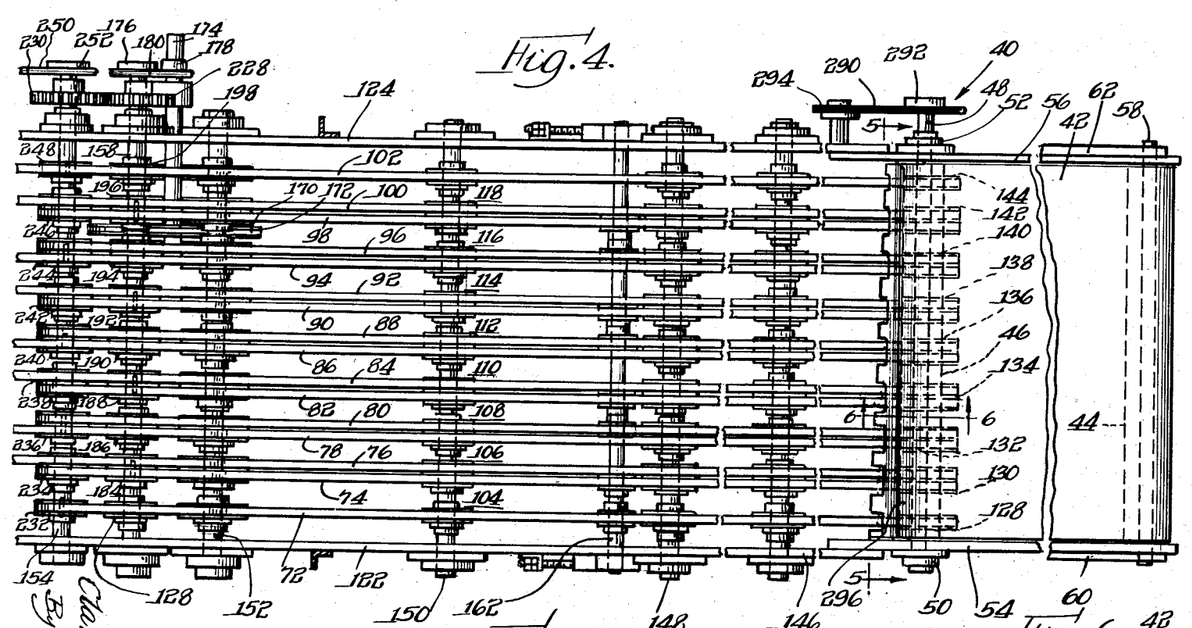
Fig. 4 is an enlarged fragmentary plan view showing a portion of the apparatus which functions to arrange and convey cans or articles in a plurality of lines as the articles are received from a source of supply.
Figure 5:
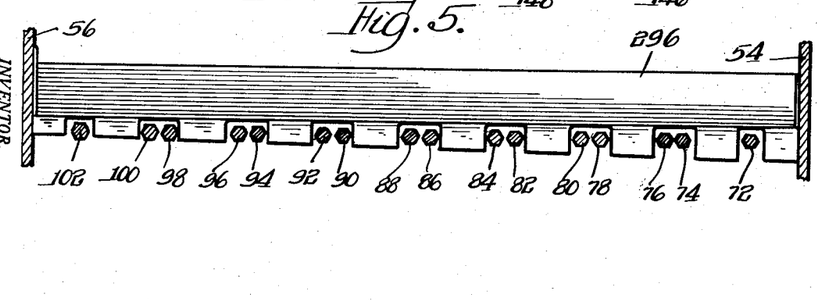
Fig. 5 is a fragmentary sectional view taken along line 5—5 in Fig. 4.
Figure 6:
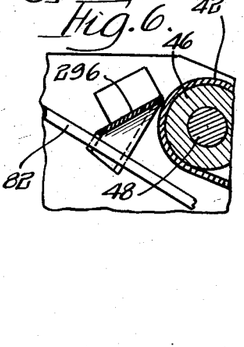
Fig. 6 is a fragmentary sectional view taken along line 6—6 in Fig. 4.
Figures 7, 7A:
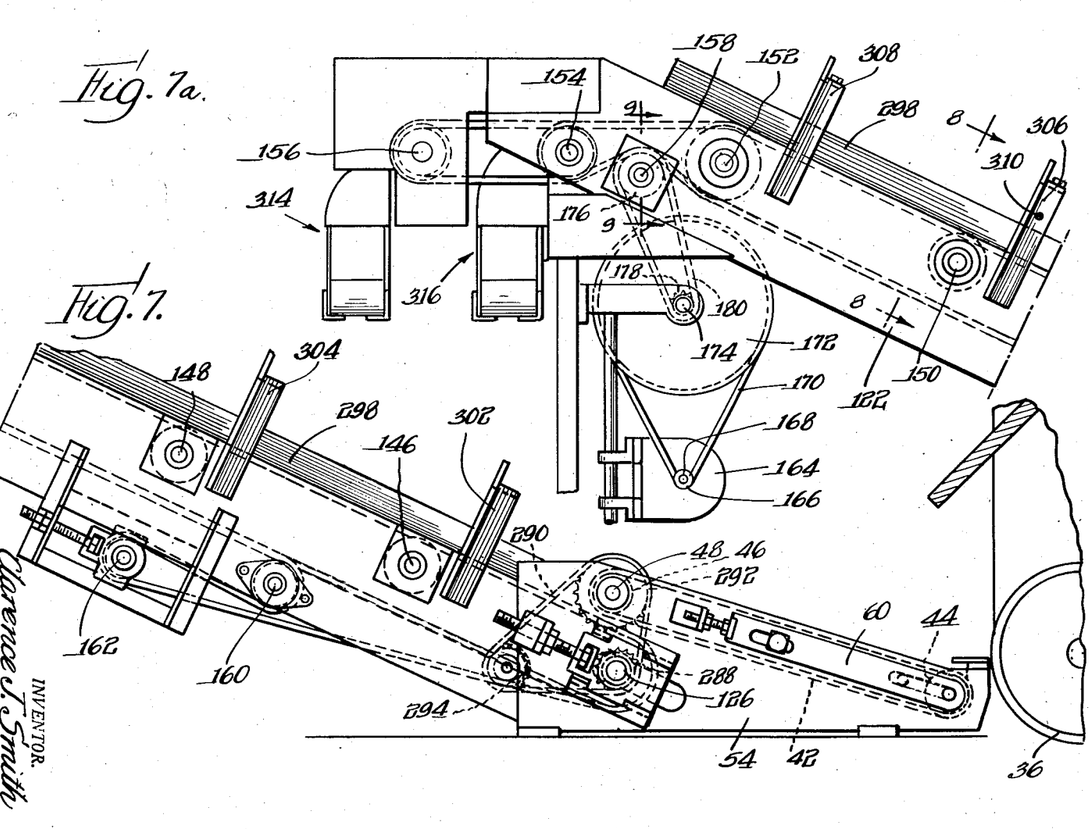
Figs. 7 and 7a combine to provide an elevational view of the portion of the apparatus shown in Fig. 4 which conveys the cans or articles endwise and also of a portion of the apparatus which rearranges the cans or articles so that they are subsequently advanced or rolled sideways.

Referring now more specifically to the drawings wherein like parts are designated by the same numerals throughout the various figures, an installation is partially shown in Figs. 1, 2 and 3 whereby cans or the like may be removed from a supply pile and then orientated for delivery to processing or can filling apparatus. The installation shown includes a large storage bin 30 adapted to contain a large supply or pile of cans for delivery to an orientating apparatus 32. The orientating apparatus delivers the cans to any point of discharge and may, for example, deliver the cans to an elevator 34 from which the cans are directed to any desired processing or filling apparatus, not shown. The storage bin is provided with a conveyor bottom 36 and a door 38 so that when it is desired to discharge the cans from the bin, the door is opened and the conveyor 36 is actuated to move the cans through the door opening.

The orientating apparatus 32 comprises a feeding and preliminary orientating section 40 which is shown in Figs. 1, 2 and 4 through 12. This section comprises an upwardly inclined conveyor belt 42 extending around a lower roller 44 disposed adjacent the bottom conveyor of the storage bin and around an upper roller 46. The upper roller is fixed on a shaft 48 rotatably supported by suitable bearings 50 and 52 mounted on side frame members 54 and 56 of the apparatus frame. The lower roller 44 is carried by a shaft 58 adjustably mounted by brackets 60 and 62 so that the proper tension may be maintained in the conveyor belt 42. As shown in Fig. 1, the conveyor 42 is preferably centrally located with respect to the bottom conveyor 36 of the storage bin so as to receive a portion of the cans directly from the bottom conveyor. Laterally extending conveyors 64 and 66 respectively driven by motor and speed reducing units 68 and 70 are provided at opposite sides of the conveyor 42 for directing cans discharged from the storage bin onto the conveyor 42.

It will be appreciated that the cans may be piled on and indiscriminately positioned on the conveyor belt 42, and in order to eliminate piling of the cans and to obtain preliminary orientation of the cans in a plurality of single file lines, the section 40 is provided with a plurality of narrow belts 72 through 102 which are spaced and driven in the manner to be described. More specifically, the narrow belts are spaced as shown best in Figs. 4, 5, 8 and 9 so as to provide a plurality of can conveying paths or lines 104 through 118, each of which lines is formed by a pair of the belts that are spaced apart a distance less than the diameter of the cans but sufficient to permit the cans to extend partially therebetween. For example, the belts 72 and 74 are spaced to provide the conveying line 104 and the belts 76 and 78 are spaced to provide the next conveying line 106. However, it should be noted that the belts 74 and 76 are arranged close to each other so that any cans falling onto these belts from the conveyor 42 will normally gravitate to either the path 104 or the path 106. The remaining belts are similarly arranged in closely positioned pairs with each pair properly spaced from an adjacent pair, except, of course, for the opposite side belt 102. It is desired that the cans lie on their sides and be carried in an endwise fashion along the various paths of travel. The proper position for the cans 120 is shown by the can located in the path 118 in Fig. 8. However, when the cans are first deposited on the narrow belts it is possible for them to assume the positions of the cans shown in the paths 112 and 116 in Fig. 8. In order to twist the cans thus positioned so that they will assume the proper position, the belts at opposite sides of each path of travel are driven at different speeds. For example, the belt 102 at one side of the path 118 is driven at a relatively slow speed, the belts 98 and 100 are driven at a relatively fast speed, the belts 94 and 96 are driven at a relatively slow speed and so on.

The structure for supporting and driving the narrow belts to accomplish the results mentioned above will now be described. The apparatus is provided with upwardly inclined side frame means 122 and 124. Adjacent the lower end of the side frame means a lower pulley shaft 126 is carried by suitable bearing members that are adjustably mounted for tensioning purposes. This shaft carries a single pulley 128 for the belt 72, double pulleys 130, 132, 134, 136, 138, 140 and 142 for the intermediate pairs of belts and a single pulley 144 for the opposite side belt 102. From these lower pulleys, the upper courses of the narrow belts extend over idler pulleys mounted on rotatably supported shafts 146, 148, 150 and 152. From the pulleys on the shaft 152 the belts of alternate paths of travel respectively pass around pulleys on a shaft 154 and pulleys on a shaft 156 which is spaced forwardly from the shaft 154. For example, the belts 100 and 102 which provide the path of travel 118 extend around the pulleys on the shaft 156 while the belts 96 and 98 of the adjacent path of travel 116 extend around the pulleys on the shaft 154. As a result of this arrangement the cans from alternate paths of travel are discharged from the narrow belts at separate locations and are subsequently arranged in two lines rather than eight lines for further orientation in the manner described below. The lower courses of all the narrow belts pass from the forward pulley shafts 154 and 156 over pulleys on a shaft 158, then beneath the pulleys on the shaft 152 and finally to the pulleys on the lower shaft 126. Preferably all the narrow belts are manufactured so that they have the same length. Therefore in order to take up the extra length of the belts which pass around the pulleys on the shaft 154, these belts are passed around idler pulleys on a shaft 160 and are doubled back over pulleys on a shaft 162 which is adjustably mounted for tensioning purposes.

Figures 8, 9:
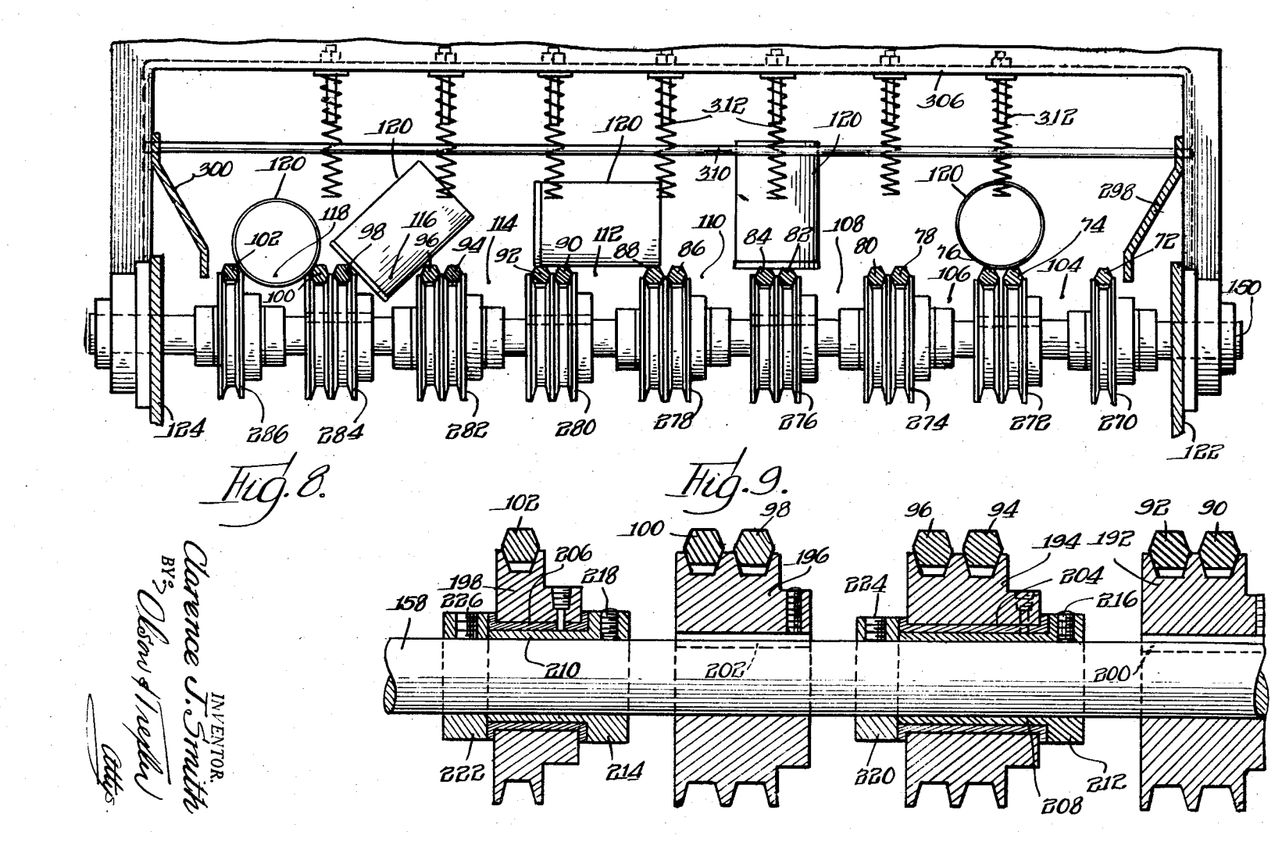

A motor unit 164 is provided for driving the narrow conveyor belts, which unit has a small pulley 166 fixed on its output shaft 168. A drive belt 170 extends around this pulley and also around a large pulley 172 fixed on a rotatably supported shaft 174. The pulley shaft 158 is driven from the shaft 174 by sprockets 176 and 178 respectively mounted on these shafts and a drive chain 180. Pulleys 182 through 198 are disposed on the shaft 158 for engagement with the narrow belts. The opposite end pulleys 182 and 198 are single pulleys and the intermediate pulleys are double pulleys. Certain of these pulleys are keyed or otherwise fixed to the shaft 158 so that they are effective for driving their associated belts and the remaining pulleys are freely rotatable on the shaft so that they serve only as idler pulleys. More specifically, Fig. 9 shows this structure in part and shows pulleys 192 and 196 fixed to the shaft by keys 200 and 202. It is understood that alternate pulleys 184 and 188 are also keyed to the shaft. The remaining pulleys are provided with bearing means so that they may rotate freely relative to the shaft 158. Thus, the pulleys 194 and 198 shown in Fig. 9 have their central apertures lined by bearing members 204 and 206 which have running fits with sleeve bearings 208 and 210 on the shaft. The sleeve bearings are respectively provided with end thrust bearing flanges 212 and 214 and are fixed with respect to the shaft by set screws 216 and 218. Axial movement of the pulleys 194 and 198 away from these thrust bearing flanges is prevented by thrust bearing rings 220 and 222 which are secured to the shaft by set screws 224 and 226. It is understood that the remaining idler pulleys on this shaft are provided with similar bearing means.

With the structure thus far described, the belts 74—76, 82—84, 90—92 and 98—100 will be driven at one predetermined and relatively high speed by their associated pulleys 184, 188, 192 and 196. In order to drive the remaining belts at a different and slower speed, a gear 228 is fixed on the shaft 158 and meshes with a larger gear 230 fixed on the shaft 154. Pulleys 232 through 248 are disposed on the shaft 154 for cooperation with the belts, and these pulleys, like the pulleys on the shaft 158 are alternately keyed or otherwise fixed to the shaft and rotatably mounted on the shaft by bearing means similar to that described above. It is to be noted however that the pulleys 232, 236, 240, 244 and 248 which are in alignment with the idler pulleys on the shaft 158 are keyed to the shaft 154 for driving the belts 72, 80, 88 and 96 which are wrapped around their associated pulleys on the shaft 154. In order to drive the belts 78, 86, 94 and 102 which extend forwardly from the drive pulleys on the shaft 154 around the pulley shaft 156, the shaft 156 is driven at the same speed as the shaft 154 by drive chain 250 which extends around a sprocket 252 on the shaft 154 and a sprocket 253 on the shaft 156. Pulleys 254 through 268 are disposed on the shaft 156 for belts 76, 78, 84, 86, 92, 94, 100 and 102 respectively. Pulleys 256, 260, 264 and 268 are keyed or otherwise secured to the shaft 156 so as to drive their associated belts and the remaining pulleys on this shaft are mounted for rotation relative to the shaft by bearing means similar to the bearing means described above.

It is not necessary to describe the pulleys on the shafts 126, 146, 148, 152, 160 and 162 in detail, but it should be understood that alternate pulleys on these shafts are respectively keyed to the shafts and freely rotatable relative to the shafts to accommodate the belts moving at different speeds. An example of this structure is illustrated in Fig. 8 which shows pulleys 270 through 286 mounted on idler shaft 150 so that the pulleys 272, 276, 280 and 284 are keyed to the shaft and the remaining pulleys are freely rotatable relative to the shaft.

In order to drive the conveyor belt 42, a relatively small sprocket 288 is fixed to the lower pulley shaft 126, and a drive chain 290 extend around this sprocket and a sprocket 292 on the conveyor shaft 48 and also around an idler sprocket 294. Thus, the conveyor 42 is driven in timed relation with the narrow belts. Preferably the sprocket 288 is smaller than the sprocket 292 so that the lineal speed of the conveyor 42 is less than the speed of the narrow belts. This enables the narrow belts to spread out any mass of cans or articles deposited thereon from the slower moving conveyor 42.

The operation of the apparatus thus far described is as follows. Upon starting of the various conveyor motors including a motor, not shown, for the bottom conveyor of the storage bin, cans are discharged from the storage bin and piled on the lower end of the conveyor 42. The conveyor 42 which is operated on a speed higher than the speeds of the storage bin bottom conveyor and the transversely extending conveyors 64 and 66 spreads out the cans piled thereon and delivers them to the lower ends of the narrow conveyor belts. As shown best in Figs. 5 and 6 a dead plate 296 traverses the lower ends of the narrow belts adjacent the upper end of the conveyor 42 so as to eliminate any possibility of the cans becoming caught and jammed between the conveyor belt 42 and the narrow belts. Furthermore, longitudinally extending side guide members 298 and 300 are disposed along the belts 72 and 102 respectively for preventing any of the cans from falling off of the narrow belts. These guide members are supported by and depend from inverted U-shaped frame members 302, 304, 306 and 308 spaced along the side frame members 122 and 124.

Since all the narrow belts are driven at a lineal speed faster than the speed of the conveyor belt 42, the cans which are piled on the lower ends of the narrow belts are further spread out and tend to gravitate into the paths of travel 104 through 118. Any cans which happen to assume positions of the cans shown in paths 112 and 116 in Fig. 8 will be twisted into the proper endwise positions in the manner described above. It is also possible for cans to come to rest initially on a pair of the narrow belts moving at the same speed as indicated by the upright can on the belts 82 and 84 and the can lying on its side on belts 74 and 76 in Fig. 8. In order to displace any such upright cans so that they will fall into one of the paths of travel, a crossbar 310 is supported between opposite sides of the frame member 306 for engaging upper ends of such cans. Means is also provided for displacing any cans which initially come to rest on their sides on a pair of belts moving at the same speed, and this means comprises a plurality of flexible fingers or springs 312 secured to and depending from the frame member 302. As shown in Fig. 8 each of the depending spring elements 312 is in vertical alignment with one pair of closely adjacent belts. As will be understood, all the cans deposited on the narrow belts will eventually assume endwise positions in one of the paths of travel whereby preliminary orientation of the cans in a plurality of single file lines is obtained. However, the cans in these lines are not orientated as to the relative positions of their closed or bottom ends.

Figure 10:
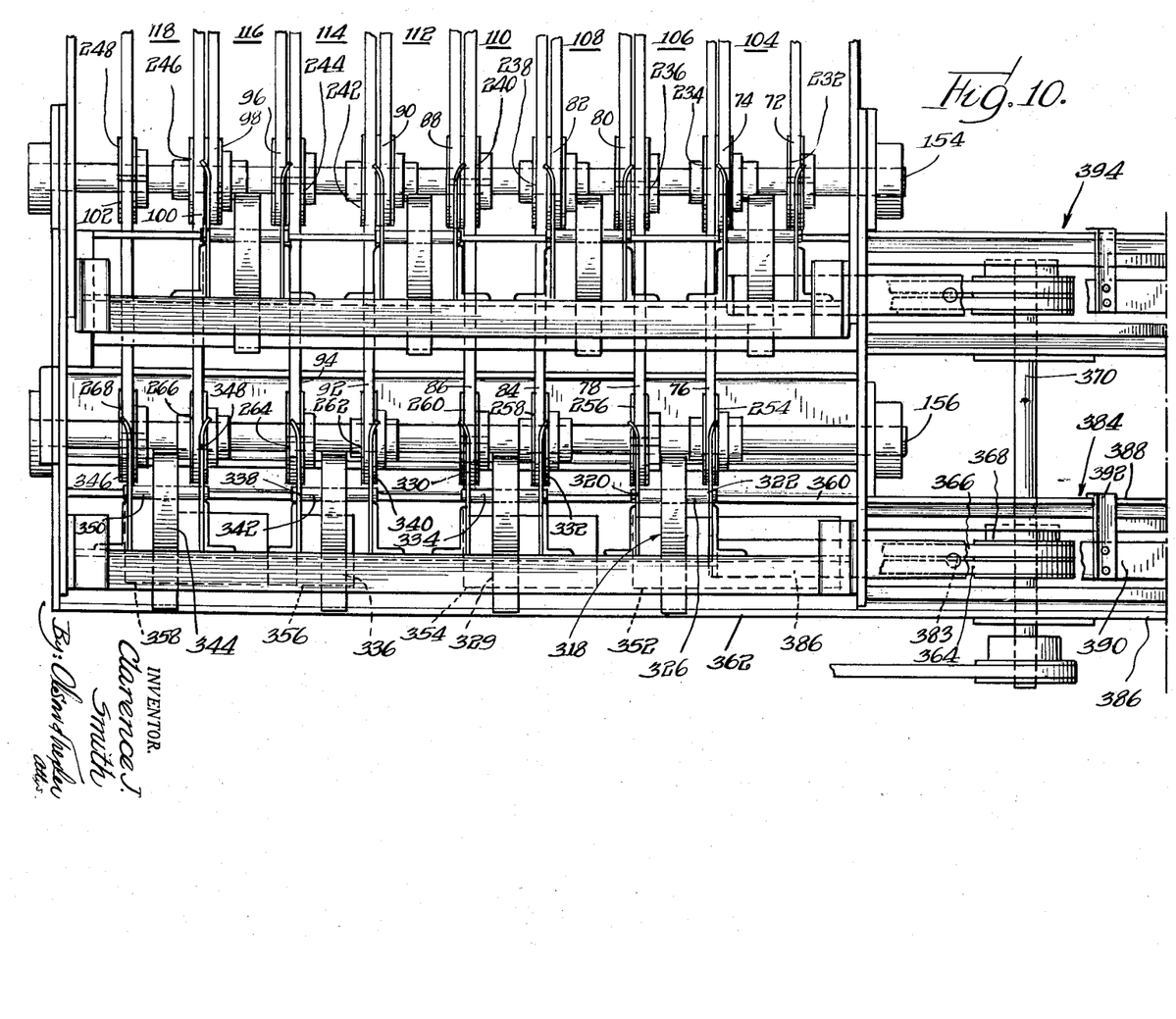
Fig. 10 is a fragmentary plan view of the portion of the apparatus which serves to re-position the cans or articles being conveyed endwise so that the cans are subsequently advanced or rolled sideways.
Figure 11:
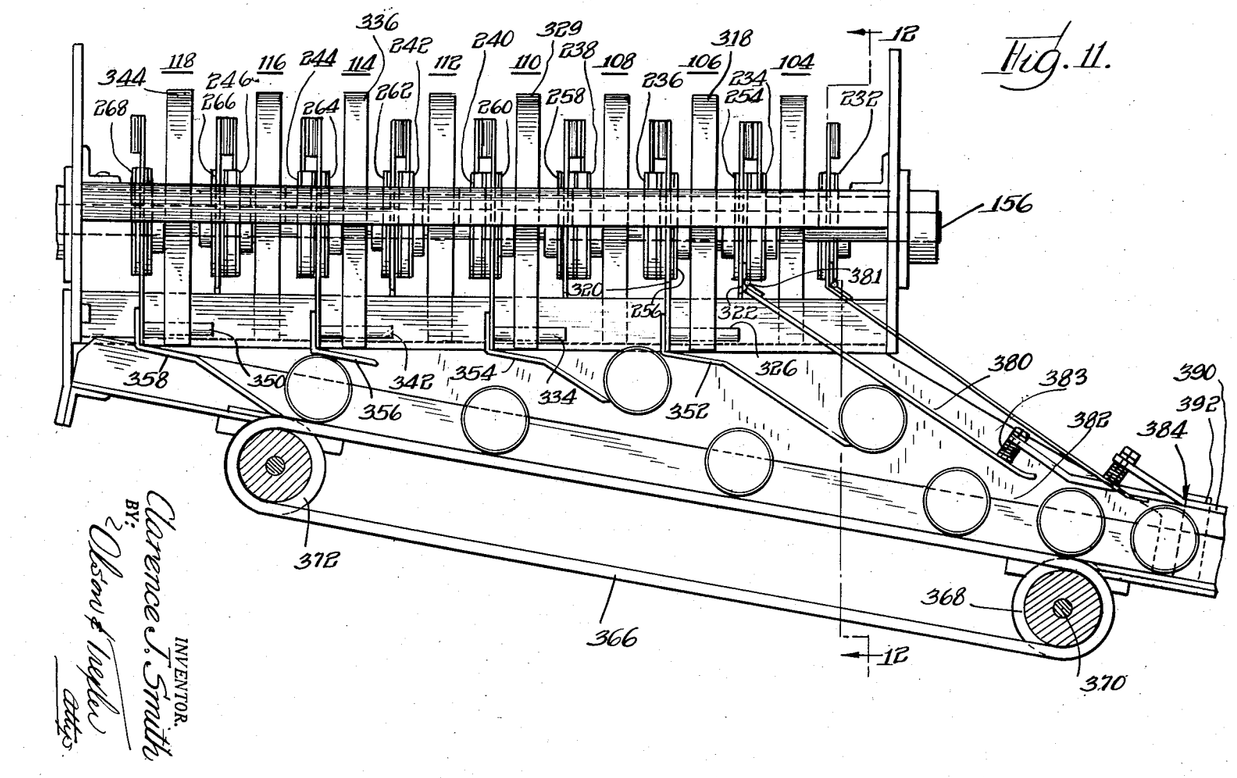
Fig. 11 is a fragmentary sectional view taken along line 11—11 in Fig. 12.
Figure 12:
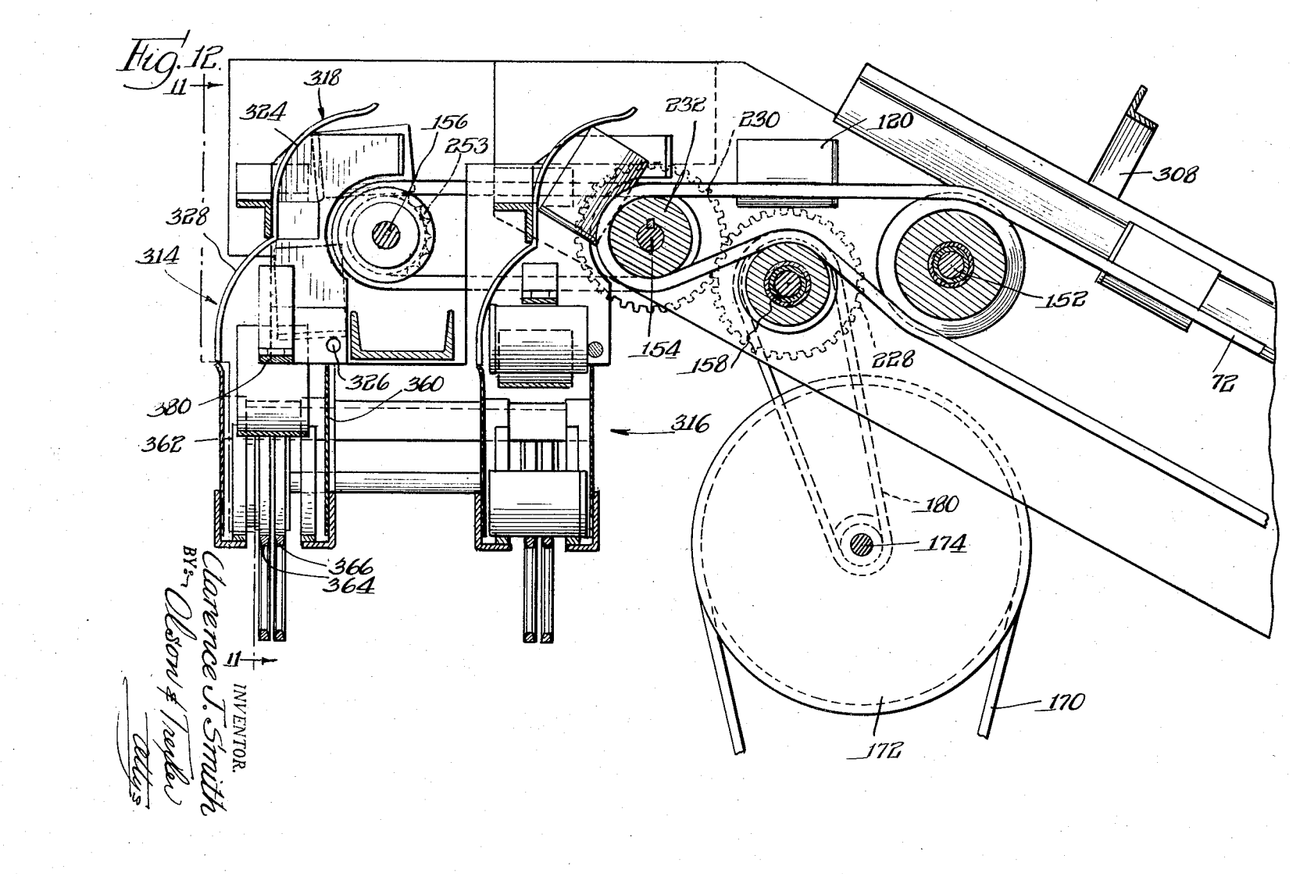
Fig. 12 is a cross sectional view taken along line 12—12 in Fig. 11.

In the embodiment illustrated the cans are initially arranged in eight lines on the narrow belts, and in order to complete the preliminary orientation, the cans delivered from the narrow belts are arranged in a lesser number of lines, preferably two, and also so that they may be rolled or moved laterally rather than in an endwise manner. To accomplish this, a pair of drop box structures 314 and 316 shown best in Figs. 10, 11 and 12 are provided for receiving the cans from the narrow belts and for repositioning the cans. More specifically, the structure 314 is disposed for receiving cans from the narrow belts extending forwardly around the pulleys on the shaft 156 and providing the relative long paths of travel 106, 110, 114 and 118 and the structure 316 is disposed for receiving the cans from the relatively short paths of travel 104, 108, 112 and 116. The structure 314 is provided with an end guide member 318 and opposite side guide plates 320 and 322 which form a chute for receiving cans from the path of travel 106. As shown in Fig. 12 the guide member 318 has an upper arcuate portion 324 for guiding the cans downwardly in an endwise manner. A pin or abutment member 326 is disposed between the side guides at a location beneath and rearwardly of the lower end of the arcuate guide portion 324 so as to engage a falling can at a point offset substantially rearwardly from the axis of the can whereby to cause the can to tilt forwardly. The guide member 318 has a lower curved portion 328 which is offset from the upper portion 324 so as to permit a can engaging the pin 326 to tilt forwardly until it assumes a horizontal position. The structure 314 is also provided with end and side guide members 329, 330 and 332 and a pin member 334 for re-orientating cans from the line 110, and end and side guide members 336, 338, 340 and pin 342 associated with the path of travel 114, and end and side guide members 344, 346 and 348 and pin 350 associated with the path of travel 118.

The cans which are re-orientated by the pins 326, 334, 342 and 350 respectively fall onto downwardly inclined rails 352, 354, 356 and 358 and are confined between opposite side means 360 and 362 of the box structure. The structure has a downwardly inclined bottom which is provided in part by a pair of conveyor belts 364 and 366 extending around a pulley 368 on a drive shaft 370 and around an idler pulley 372. The rail 358 has a relatively sharply downwardly inclined extension for depositing the cans directly onto the conveyor belts 364 and 366, and the remaining rails either terminate or have sharply downwardly extending extensions terminating a distance above the conveyor belts somewhat greater than the diameter of the cans. It will be appreciated that the cans may tend to pile up on the conveyor belts 364 and 366, particularly adjacent forward ends thereof, but this tendency is minimized by driving the conveyor belts at a speed substantially in excess of the speed at which the individual cans are fed into the drop box structure. As shown in Fig. 1, the drive shaft 370 of the conveyor belts 364 and 366 may be provided with a sprocket 374 driven from a motor and speed reducing unit 376 by a chain 378. A front guide member 380 is hingedly connected as at 381 and resiliently supported at 383 forwardly of the rail member 352 for yieldably confining the cans and providing a narrow throat 382 through which only a single can may pass at a time. The cans passing through the throat 382 enter a downwardly inclined gravity feed conveyor or chute 384 for delivery to the apparatus which further orientates the cans so that their closed or bottom ends are positioned in a predetermined manner. The gravity conveyor 384 comprises a pair of oppositely disposed guides 386 and 388 along which the cans roll and an upper or hold-down guide member 390 which is supported by a plurality of brackets 392.

The drop box structure 316 is essentially identical to the drop box structure 314 and therefore need not be described in detail. It is, of course, understood that the drop box structure 316 is arranged to receive and reorientate cans from the paths of travel 104, 108, 112 and 116. Cans from the drop box structure 316 are delivered by a gravity feed conveyor 394 which is essentially identical to the conveyor 384 for further orientation.

Referring now particularly to Figs. 13 through 16, there is shown in detail a portion of the orientating apparatus which is adapted to handle the two lines of cans delivered by the gravity conveyor 384 and 394 and positively manipulate each can so that finally all the cans in each line have their bottom or closed ends orientated in the same manner. This portion of the apparatus comprises frame means 396 having spaced horizontal frame members 398 and 400 at one side and similar horizontal frame members 402 and 404 at its opposite side. Transverse shafts 406 and 408 are rotatably mounted on frame means by suitable bearings 410—412 and 414—416 respectively. These shafts are respectively disposed adjacent above and below outlet ends of the gravity feed conveyor 384 and 394. Upper and lower can transfer disks or wheels 418 and 420 are fixed on the shafts 406 and 408 respectively and are disposed so that they extend along opposite sides of the path of travel of cans emerging from the gravity conveyor 384. Identical transfer disks or wheels 422 and 424 are mounted on the upper and lower shafts 406 and 408 respectively and project along opposite sides of the path of travel of cans emerging from the gravity feed conveyor 394. Opposed faces of the pairs of cooperable transfer wheels 418—420 and 422—424 are axially spaced from each other a distance slightly greater than the length of the cans to be handled, and each transfer disk or wheel is provided with means having a greater power to attract and retain a predetermined end of each can. More specifically, each of the transfer wheels is provided with magnetic means which has greater power to attract the closed or bottom ends of the cans than the open ends as a result of the larger mass of metal concentrated at the closed ends of the cans. Thus, in the event that a can positioned between opposing faces of the cooperable transfer disks has its closed or bottom end positioned toward the left as viewed in Fig. 14, the can will be magnetically pulled toward the left and retained by the lower transfer disk for further movement therewith. Conversely, if the closed or bottom end of the can is located toward the right, the can will be pulled toward the right and retained by the upper transfer disk for advancement therewith.

Since all of the magnetic transfer disks or wheels are essentially identical, only the disk 422 will be described in detail. The transfer disk or wheel 422 comprises a hub member 426 which is fixed to the shaft 406 by a pair of set screws 428 and 430. The hub member has an annular flange 432 to which an annular plate member 434 is connected by a plurality of screws 436. The magnetic means for attracting and retaining the cans is provided by a plurality of annularly arranged permanent magnets 438 secured about the periphery of the inner face of the annular plate or disk 434 by screws or the like 440 and 442. In order to prevent the edges of the cans from becoming dented or any enamel on the cans from becoming chipped when the cans are drawn toward the magnets which are made from a relatively hard material such as Alnico, the face of each magnet is covered by pads 444 and 446 formed from a relatively soft metal such as brass. These pads may also be secured in position by the screws 440 and 442.

Figure 13:
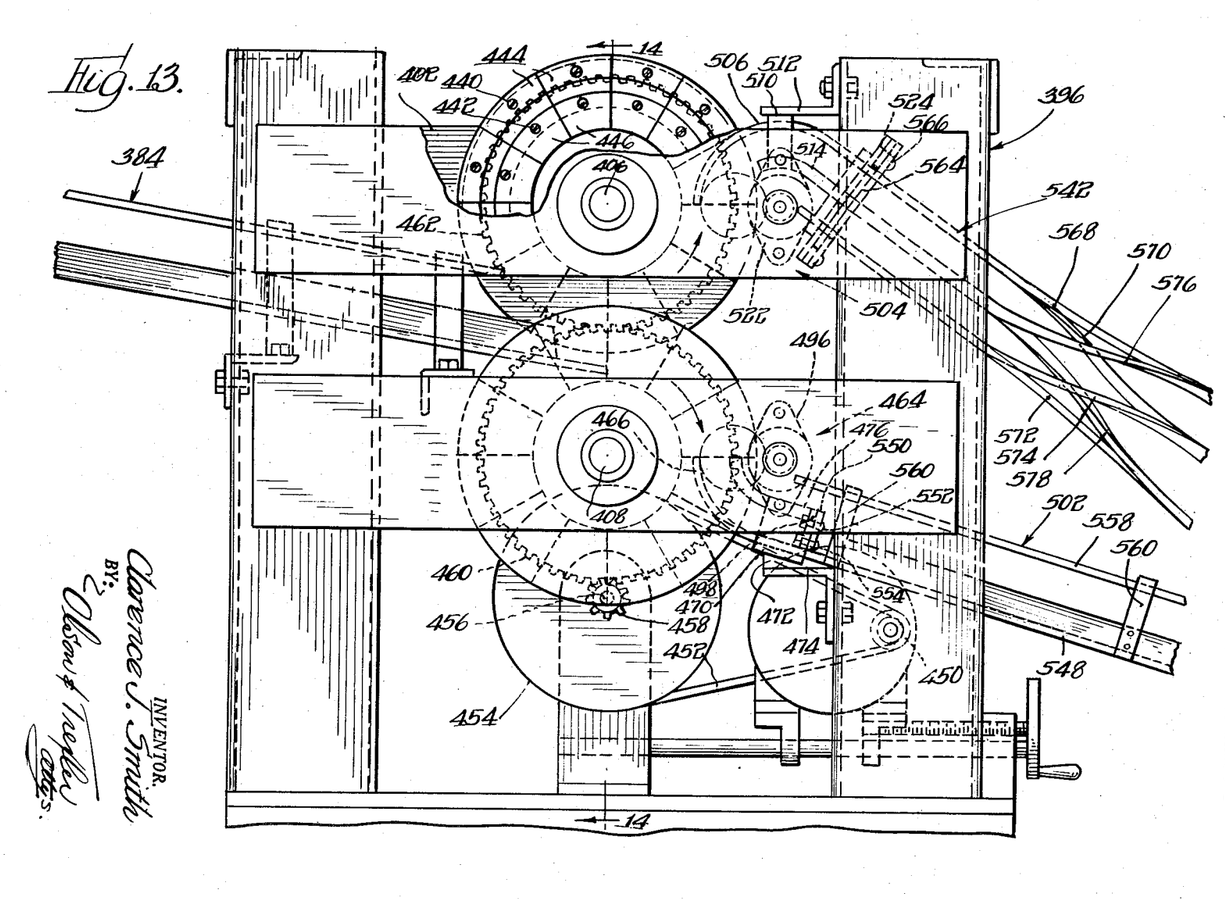
Fig. 13 is a fragmentary side elevational view showing a portion of the apparatus which functions to unscramble or orientate cans or articles fed thereto so that the cans are arranged with their bottoms or closed ends in the same positions.

The shafts 406 and 408 are respectively driven in counterclockwise and clockwise directions as viewed in Fig. 13 and at a lineal speed greater than the speed of the conveyor belts at the bottoms of the drop boxes so as to prevent the cans from stacking up in the gravity feed chutes 384 and 394. A motor 448 is provided for driving the shafts 406 and 408, which motor has a small pulley 450 fixed on its output shaft. A drive belt 452 extends around this pulley and around a large pulley 454 mounted on a rotatably supported shaft 456, see Fig. 1. A pinion 458 is secured to the shaft 456 and meshes with a gear 460 keyed or otherwise secured to the shaft 408. This gear in turn meshes with and drives a gear 462 keyed or otherwise secured to the shaft 406.

Figures 14, 15:
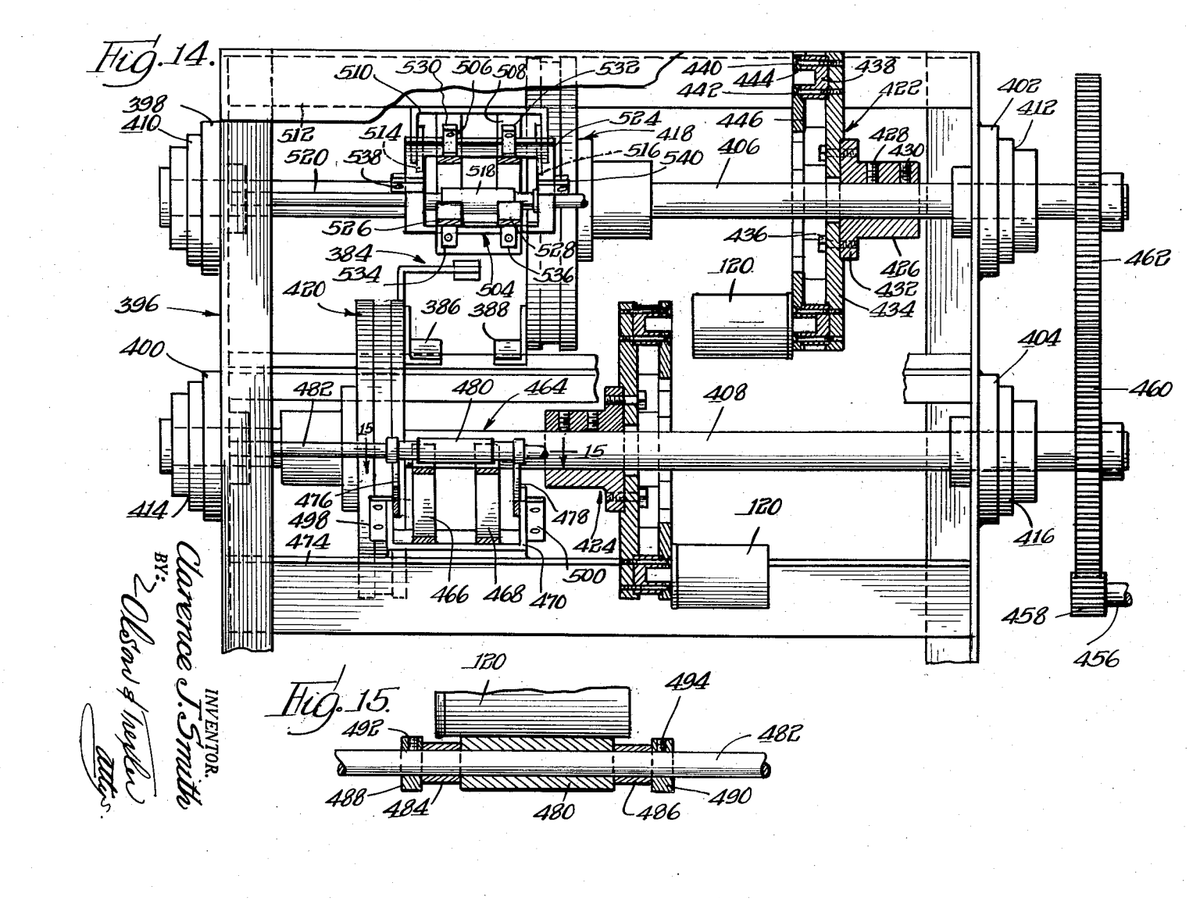
Fig. 14 is a view partially in elevation and partially in cross section along line 14—14 in Fig. 13.
Fig. 15 is a fragmentary sectional view taken along line 15—15 in Fig. 14.

The cans which are picked up by the lower transfer disk or wheel 420 are carried forwardly and downwardly about one-quarter of a turn to a stripping assembly 464. This assembly comprises a pair of upwardly inclined and curved stripper members 466 and 468 which are welded or otherwise secured to the bottom of a U-shaped bracket 470 and project across the arcuate path of cans carried by the transfer wheel 420. The bracket is secured to an inclined mounting block 472 which in turn is connected to a transverse frame member 474. Opposite upwardly curved side guide members 476 and 478 are secured to upstanding legs of the U-shaped bracket to retain opposite ends of the cans. In order to hold the cans down on the stripper members 466 and 468, at least until the cans have been completely removed from the transfer wheel and are under full control of the stripper members, an abutment member 480 is provided. This abutment member is preferably rotatably mounted so as to reduce any sliding frictional contact with the cans and thereby prevent scratching or marring of the cans, and as shown in Figs. 14 and 15 the abutment member 480 is in the form of a sleeve rotatably mounted on a shaft 482. Bearing elements 484 and 486 are mounted on the shaft at the opposite ends of the sleeve 480 and are retained against axial movement along the shaft by rings 488 and 490 which are respectively secured by set screws 492 and 494. The shaft 482 completely traverses the apparatus and has opposite ends thereof respectively mounted to the frame members 400 and 404 by suitable members 496. Apertured flanges 498 and 500 are secured to the opposite legs of the U-shaped bracket 470 to permit attachment to the stripping assembly of a downwardly inclined gravity feed conveyor 502.

Cans which are picked up by the transfer disk or wheel 418 are carried forwardly and upwardly about one-quarter of a turn to a stripping assembly 504. This assembly comprises a pair of stripper members 506 and 508 which project across the path of travel of cans and are secured to an inverted U-shaped bracket 510 which, in turn, is connected to a transverse frame member 512. Side guide members 514 and 516 are secured to depending legs of the bracket 510, and a rotatable abutment member or sleeve 518 is positioned for maintaining cans in engagement with the stripper members. The rotatable sleeve 518 is essentially identical to the similar member 480 described above, and it suffices to state that the sleeve 518 is rotatably mounted on a shaft 520 which has its opposite ends supported on the frame members 398 and 402 by suitable members 522. A rectangular frame 524 is secured to outer downwardly inclined ends of the stripper members 506 and 508 and side guides 514 and 516. A pair of short bottom rails 526 and 528 are secured to and extend upwardly from the lower horizontal section of the rectangular frame member to positions adjacent the rotatable sleeve 518. A plurality of apertured tabs 530, 532, 534, 536, 538 and 540 is secured to the rectangular frame member 524 to permit attachment of a downwardly inclined gravity conveyor or chute 542.

It is to be understood that stripping assemblies, not shown, which are essentially identical to the above described assemblies 464 and 504 are respectively provided for stripping cans from the transfer wheel 424 and for stripping cans from the transfer wheel 422. Conveniently, the rotatable abutment members or sleeves for these stripping assembliese are also respectively mounted on the shafts 482 and 520. Cans stripped from the transfer wheel 424 are directed to a downwardly inclined gravity conveyor 544 shown in part in Figs. 1 and 17 and cans stripped from the transfer wheel 422 are delivered to a gravity conveyor 546 also shown in part in Figs. 1 and 17. The conveyors 544 and 546 are identical to the conveyors 502 and 542 which will be described in detail below.

Figures 16, 17:
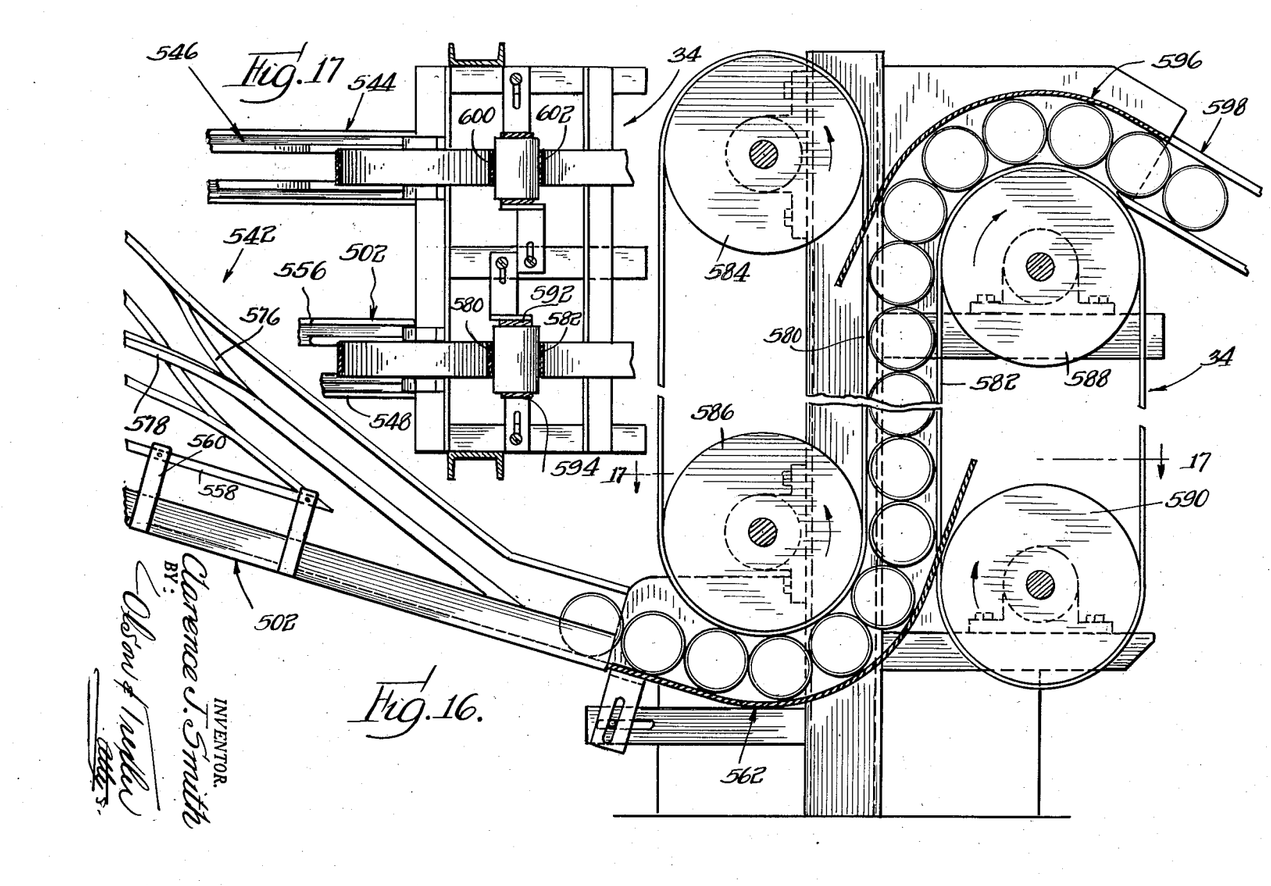
Fig. 16 is an enlarged partial cross sectional view taken along line 16—16 in Fig. 1.
Fig. 17 is a fragmentary sectional view taken along line 17—17 in Fig. 16.

As shown in Figs. 13, 16 and 17 the gravity conveyor or chute 502 comprises a first bottom and side rail 548 having a flange 550 secured to its upper end and connected to the flange 498 of the stripper assembly 464 by suitable bolts 552 and 554. An opposite bottom and side rail 556 has its upper end similarly connected to the flange 500 of the stripper assembly. A hold-down rod 558 may be provided above the bottom rails, which rod is supported by a plurality of brackets 560. The lower end of the conveyor 502 extends to the bottom end of the elevator 34 and delivers the cans to suitable guide means 562 of the elevator. It is understood that all of the cans delivered to the conveyor or chute 502 from the stripper assembly 464 will have their ends positioned in the same manner.

The gravity conveyor 542 has an upper end adapter member 564 which is adapted to be secured to the tabs 530 through 540 by a plurality of bolts or the like 566. A pair of elongated bars or rails 568 and 570 have their upper ends secured to the upper side of the adapter member 564 and similar rails 572 and 574 have their upper ends secured to the lower side of the adapter member. Opposite side rails 576 and 578 have their upper ends secured to opposite sides of the adapter member. As will be understood, all the cans delivered to the conveyor or chute 542 from the stripper assembly 504 have their closed or bottom ends positioned in the same manner but oppositely from the closed or bottom ends of the cans rolling down the chute 502. Therefore, the rails or bars of the chute 542 are spiraled through 180° as shown in Figs. 13 and 16 so as to orientate the closed or bottom ends of the cans rolling down this conveyor or chute in the same manner as the cans rolling down the conveyor or chute 502. As shown in Fig. 16 the lower end of the conveyor or chute 542 opens into a lower end portion of the conveyor or chute 502. Thus, the lines of cans rolling down the conveyors 502 and 542 merge into a single line of cans which are properly orientated for delivery to the guide means 562 of the elevator.

The elevator may be of any suitable construction, and in the embodiment shown comprises a pair of opposed upwardly extending conveyor belts 580 and 582 which are adapted to receive and retain the cans therebetween for movement upwardly therewith. The belt 580 extends around suitably mounted upper and lower pulleys 584 and 586, and the belt 582 extends around similar upper and lower pulleys 588 and 590. Upstanding opposite end guide members 592 and 594 are provided for preventing the cans from slipping endwise from between the belts. Suitable guide means 596 is provided at the upper end of the elevator for directing the can from the belts to a conveyor or chute 598 by which the cans may be delivered to processing or filling machines or any other suitable point of discharge. The elevator also includes a second pair of cooperable conveyor belts 600 and 602 and complementary guide members for handling the line of orientated cans delivered by the chutes 544 and 546 and directing such cans to a second overhead conveyor similar to the conveyor or chute 598. As shown in simplified form in Fig. 1 a motor 604 and suitable drive means 606 is provided for driving the conveyor belts of the elevator structure. Preferably, this drive means is such that the elevator conveyor belts are driven at a lineal speed which is greater than the lineal speed of the transfer disks or wheels of the orientating apparatus so as to prevent the cans from piling up in the gravity feed conveyors 502 and 544.

While the preferred embodiment of the present invention has been shown and described herein, it is obvious that many structural details may be changed without departing from the spirit and scope of the appended claims.

The invention is claimed as follows:

1. An apparatus for orientating articles such as cans and the like having a greater mass of magnetizable material at one end than the other, comprising means for arranging and conveying a plurality of series of the articles in endwise relationship and in single file, means at a discharge end of said first mentioned means for rearranging the articles and directing the articles from said plurality of series along a single path of travel with the articles positioned transversely of said path of travel, a pair of magnetic rotatable transfer means disposed in opposing relationship at opposite sides of said path of travel for attracting and retaining only articles having said one end with the greater mass of magnetizable material at their respective sides of the path of travel, first conveyor means for receiving articles from one of said transfer means, second conveyor means disposed for receiving articles from the other of said transfer means, said conveyor means merging at a location spaced from said pair of transfer means, and one of said last mentioned conveyor means including means for turning articles thereon to reverse the positions of the ends of said articles.

2. An apparatus for orientating articles such as cans and the like each having a greater mass of magnetizable material at one end than the other, comprising a relatively broad upwardly inclined endless conveyor for delivering articles from a source of supply, a plurality of parallel relatively narrow endless conveyor members disposed for receiving the articles from said first mentioned conveyor and for arranging the articles in endwise relationship and in more than two single file series, a pair of drop box means at the discharged ends of said narrow conveyor members for receiving the articles and turning the articles about transverse axis of the articles and for rearranging the articles in a pair of lines with the articles positioned transversely of the lines, a pair of conveyor means disposed for directing the articles from said drop box means along a pair of paths of travel with the articles positioned transversely of said paths of travel, a first pair of rotatable magnetic transfer wheels mounted for rotation about parallel axes respectively above and below one of said paths of travel, said wheels respectively extending along opposite sides of said one path of travel, a second pair of rotatable magnetic transfer wheels mounted for rotation about axes respectively above and below the other of said paths of travel, said second mentioned transfer wheels respectively extending along opposite sides of said second mentioned path of travel, each of said transfer wheels attracting and retaining only articles having said one end with the larger mass of magnetizable material at its side of its associated path of travel, a pair of discharged conveyors respectively disposed for receiving articles from the lower transfer wheels, and a second pair of discharged conveyors respectively disposed for receiving articles from the upper transfer wheels, and merging with said first mentioned discharged conveyors, one discharged conveyor of each associated upper and lower discharged conveyors including means for turning the articles to reverse the positions of the ends thereof.

3. An apparatus for orientating articles such as cans and the like having an end member applied to only one end thereof comprising a pair of parallel endless conveyor members spaced a distance less than the diameter of the articles for enabling the articles to rest thereon in endwise relationship, means for driving one of said conveyor members faster than the other to insure positioning of articles thereon in endwise relationship, means at a discharged end of said conveyor members for rearranging the articles and directing the articles along a path of travel with the articles positioned transversely of said path of travel, a pair of rotatable magnetic transfer means disposed along opposite sides of said path of travel for attracting and retaining only articles having the end member located at their respective sides of said path of travel, a first discharged conveyor disposed for receiving articles from one of said transfer means, and a second discharged conveyor disposed for receiving articles from the other of said transfer means and merging with said first discharged conveyor, one of said discharged conveyors including means for turning the articles to reverse the positions of the ends of said articles.

4. In an apparatus for orientating a plurality of articles such as cans and the like each having an end member applied to one end thereof and an opposite opened end, means for directing a series of said articles along a predetermined path of travel with the articles disposed transversely of said path of travel, and a pair of rotatably mounted magnetic transfer wheels respectively extending adjacent opposite sides of said path of travel and respectively mounted for rotation about substantially parallel axes located above and below said path of travel for attracting and retaining only articles having said end members located at their respective sides of the path of travel.

5. In an apparatus for orientating a plurality of articles such as cans or the like moving in a series along a path of travel with the articles disposed transversely of the path of travel and each having an end member applied to one end thereof and an opposite opened end, first and second rotatable magnetic transfer wheels respectively extending adjacent opposite sides of said path of travel for attracting and retaining only articles having end members disposed at their respective sides of the path of travel, conveyor means for receiving articles from said first transfer wheel, second conveyor means disposed for receiving articles from said second transfer wheel and merging with said first conveyor means at a location spaced from said transfer wheels, one of said conveyor means including means for turning articles thereon in advance of said location to reverse the positions of the ends of said last mentioned articles.

6. In an apparatus for orientating a plurality of articles such as cans or the like each having an end member applied to one end thereof and an opposite opened end, means for directing a series of said articles along a predetermined path of travel with the articles disposed transversely of said path of travel, rotatable magnetic transfer wheel means disposed along one side of said path of travel for attracting and retaining only articles having said end member located at said one side of the path of travel, stripper guide means extending adjacent said transfer wheel for removing articles from said transfer wheel, and a rotatably mounted abutment member disposed adjacent said guide means for maintaining articles in association with said guide means.

7. In an apparatus for orientating a plurality of articles such as cans and the like each having an end member applied to one end thereof and an opposite open end, means for directing series of articles along a plurality of adjacently disposed paths of travel, a plurality of pairs of first and second cooperable rotatable magnetic transfer means, each of said first transfer means being respectively disposed adjacent a first side of one of said paths of travel and each of said second transfer means being disposed adjacent a second side of one of said paths of travel, all of said transfer means being capable of attracting and retaining only articles having said end member disposed at their respective sides of the paths of travel of said transfer means, and a plurality of pairs of conveyors respectively disposed for receiving articles from the pairs of first and second transfer means, one conveyor means of each pair of conveyor means including means for turning the articles to reverse the positions of the ends of said last mentioned articles.

8. In an apparatus for orientating a plurality of articles such as cans and the like, first and second laterally spaced and substantially parallel endless conveyor members, third and fourth closely adjacent and substantially parallel narrow endless conveyor members disposed between and respectively substantially spaced from said first and second endless members a distance less than a diameter of the articles for arranging series of articles in endwise relationship respectively on said first and third conveyor members and on said second and fourth conveyor members, means for driving said first and third conveyor members at different speeds and for driving said second and fourth conveyor members at different speeds to insure arrangement of the articles in endwise relationship, and means disposed for receiving the articles from said conveyor members and for orientating said articles with predetermined ends thereof located in a predetermined manner.

9. An apparatus, as defined in claim 8, wherein said last mentioned means includes means for receiving articles at first and second locations from said conveyor members, said first and third conveyor members extending beyond said second and fourth conveyor members to said first location, and said second and fourth conveyor members extending to said second location.

10. An apparatus, as defined in claim 8, wherein said means for driving said conveyor members includes means for driving said third and fourth conveyor members at the same speed, which apparatus includes means disposed above and in alignment with said third and fourth conveyor members for displacing any article which may initially come to rest solely on said third and fourth conveyor members.

11. An apparatus, as defined in claim 8, which includes means disposed above and traversing said conveyor members for displacing any articles which may initially come to rest in generally upright positions on said conveyor members.

References Cited in the file of this patent

UNITED STATES PATENTS

| 1,696,715 | Huddleston | Dec. 25, 1928 |
| 1,886,896 | Nelson | Nov. 8, 1932 |
| 2,270,713 | Belada | Jan. 20, 1942 |
| 2,392,509 | Sells | Jan. 8, 1946 |
| 2,583,707 | Prickett | Jan. 29, 1952 |
| 2,671,550 | Schultz | Mar. 9, 1954 |
| 2,704,146 | Reck | Mar. 15, 1955 |

FOREIGN PATENTS

| 712,343 | Germany | Oct. 16, 1941 |